Figure 1:
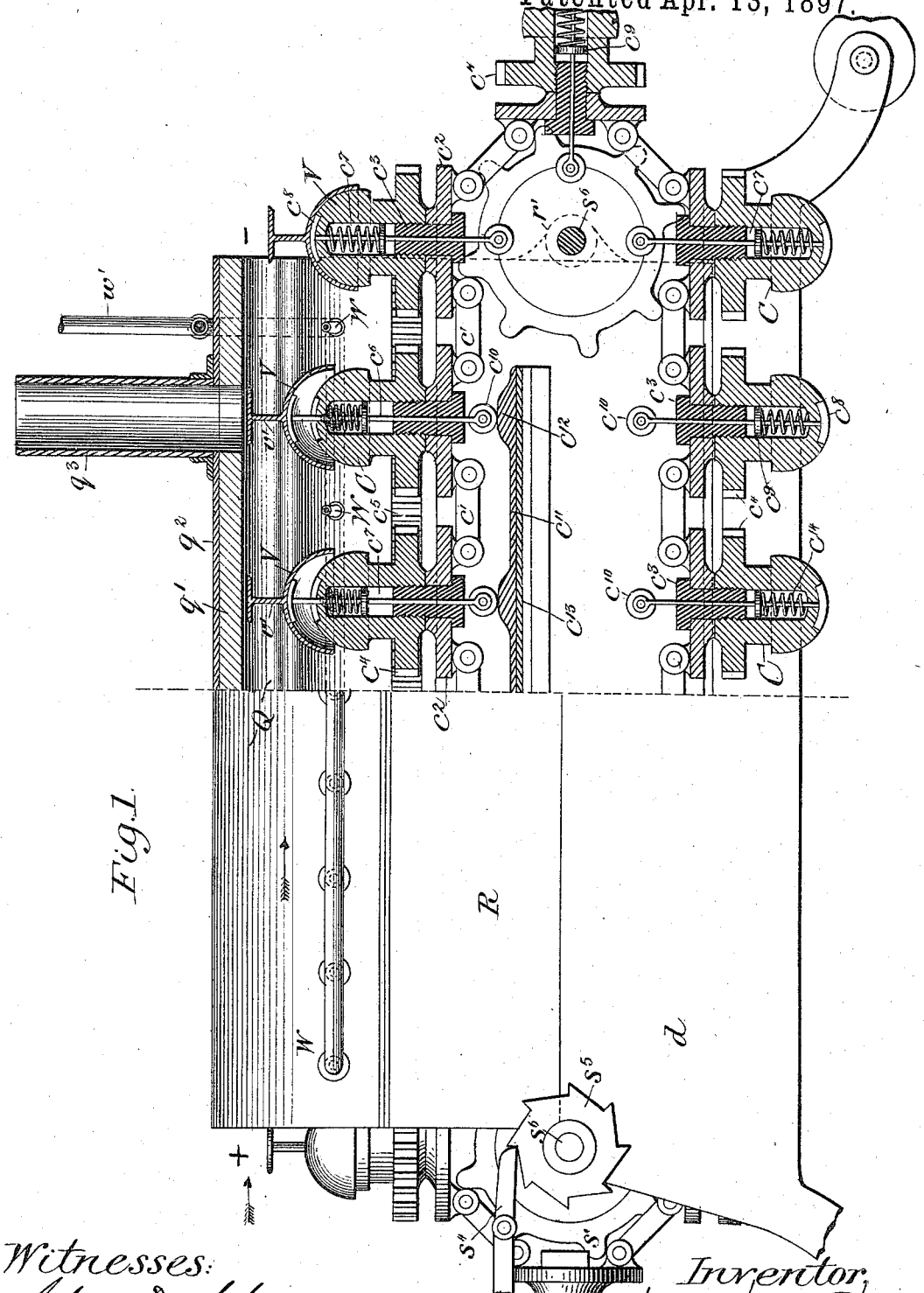

(No Model.) 2 Sheets—Sheet 1.

H. H. PITT.
FURNACE FOR POLISHING GLASS ARTICLES.

No. 580,504. Patented Apr. 13, 1897.

Witnesses:
Adam Dodd
John Guthrie Wright

Inventor,
Henry Harley Pitt (No Model.) 2 Sheets—Sheet 2.
H. H. PITT.
FURNACE FOR POLISHING GLASS ARTICLES.
No. 580,504. Patented Apr. 13, 1897.
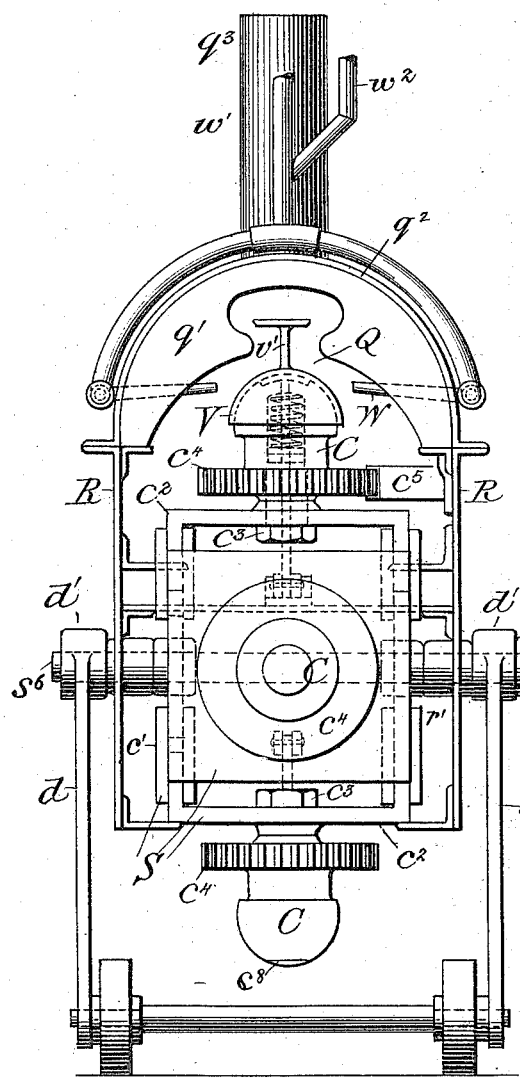
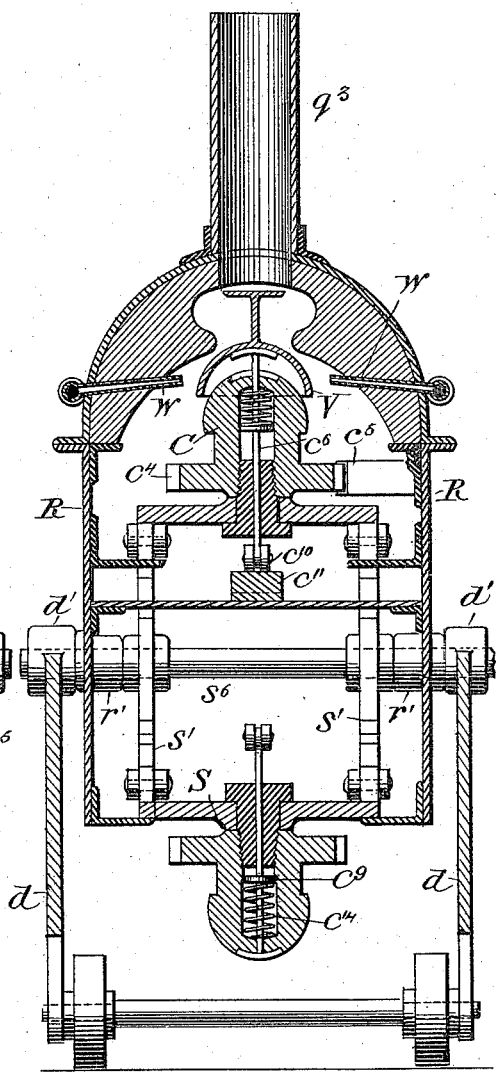
Witnesses:
Adam Dodd
John Guthrie Wright
Inventor.
Henry Harley Pitt

UNITED STATES PATENT OFFICE.

HENRY HARLEY PITT, OF LOW FELL, ENGLAND.

FURNACE FOR POLISHING GLASS ARTICLES.

SPECIFICATION forming part of Letters Patent No. 580,504, dated April 13, 1897.

Application filed February 3, 1896. Serial No. 577,900. (No model.) Patented in England March 8, 1892, No. 4,545; in Germany July 22, 1892, No. 71,671 and No. 75,507, and in Belgium November 27, 1894, No. 112,868.

*To all whom it may concern:*

Be it known that I, HENRY HARLEY PITT, a subject of the Queen of Great Britain, and a resident of Low Fell, in the county of Durham, England, have invented certain new and useful Improvements in Furnaces for Fire-Polishing Pressed or other Glass Articles, (for which I have obtained a patent in Great Britain, No. 4,545, dated March 8, 1892; in Germany, No. 71,671, dated July 22, 1892, and No. 75,507, dated July 22, 1892, and in Belgium, No. 112,868, dated November 27, 1894,) of which the following is a full, clear, and exact specification.

The object of this invention is to arrange a continuous glory-hole or fire-polishing furnace with which pressed or blown glass articles, such as tumblers, jugs, wine-glasses, goblets, dishes, and the like may be fire-polished with the least possible labor and manipulation; and my invention consists in a combination of self-acting mechanism with an especially-arranged furnace having injectors on either side, so as to impinge the heat or flame onto all parts of the glass articles as they travel along through said glory-hole, and my said invention will be found fully set forth in the accompanying drawings, of which the following is a full, clear, and exact description.

Figure 1 is a part longitudinal and part sectional elevation of my said improved combined mechanism and glory-hole. Fig. 2 is an end elevation of same, and Fig. 3 is a cross-sectional elevation taken on line $b\,b$ of Fig. 1.

I would here point out that my improved glory-hole as illustrated is not used as a leer or annealing-oven, but answers the purpose of a glory-hole, and combined with the mechanism shown dispenses with the use of pontils and the manipulation hitherto required for this function.

Similar letters of reference denote corresponding parts in each view.

The glory-hole Q is composed of suitable refractory material $q'$, incased with iron $q^2$, and the part $q'$ is preferably of the shape in cross-section as shown at Fig. 3, where it is required to fire-polish wine-glasses V or similar articles having stems $v'$ or like reduced parts.

Burners or injectors W branch inward on both sides of the glory-hole Q and are supplied with a mixture of live steam and oil conducted from a suitable storage by the pipes $w'$ and $w^2$. The said glory-hole Q is carried upon two side frames R, which are mounted on the shafts $s^6$, the latter being free to revolve within the bosses $r'$ of said frames R. Each said shaft $s^6$ carries a chain wheel or drum $s'$, which are keyed or otherwise secured thereto, and one shaft $s^6$ is caused to revolve by the action of a pawl $s^4$, which may receive a reciprocating motion from any convenient source, as will be well understood, and so works a ratchet-wheel $s^5$, which is secured to the shaft $s^6$, as shown at Fig. 1. The said chain wheels or drums $s'$ support and work forward the chain $s$, whose links are arranged in the form of coupling-pieces $c'$ and carrier-plates $c^2$.

Carriers C are supported on the plates $c^2$ by means of the screw pins or bolts $c^3$, and said carriers C are made with pinions $c^4$, which, when passing through the glory-hole Q, mesh with a rack $c^5$, fixed to one side of frame R, as shown, Fig. 2.

The glory-hole Q is arranged with a chimney $q^3$ for the products of combustion to escape therefrom.

In order to fire-polish the edges and within the inner parts of the glass articles V, I arrange each carrier C with a central rod or spindle $c^6$ and form a chamber $c^7$ within each carrier C. The upper part of spindle $c^6$ is made with a part $c^8$, which rests in a recess in the carrier C when the glass article V is completely on the carrier $c$, as shown at Fig. 2, and the said part $c^8$ is lifted at times to position shown at Fig. 3. Each spindle $c^6$ has a collar $c^9$, and a spiral spring $c^{14}$ bears thereon and against the upper part of chamber $c^7$. The lower end of spindle $c^6$ receives a runner or runners $c^{10}$, which bear on a plate or track $c^{11}$, made with inclines or projections $c^{12}$. The said plate $c^{11}$ is carried upon a cross-stay $c^{13}$, fixed to the sides or frame R.

The stems $c^6$ rotate with the surrounding block as well as the small pulleys $c^{10}$. The use of the said pulleys $c^{10}$ is not necessary to the working of the stem $c^6$, and where desired the stem $c^6$ may bear on the track $c^{11}$ and the pulleys $c^{10}$ be dispensed with.

The combined parts described are carried upon a portable truck consisting of two sides $d$, having bosses $d'$, wherein the shafts $s^6$ are free to revolve, and wheels and axles and the sides $d$ may be stayed together in any convenient manner.

As soon as the articles V are pressed, blown, or formed they are each placed on a carrier C at the entrance end + of the glory-hole Q, (see Fig. 1,) and they travel through the glory-hole Q and are simultaneously revolved by means of the pinions meshing with the rack, and are also now and again during such journey lifted up and down by means of the spindles, runners, and track, by which mechanical means all parts of each article V receive the required amount of heat or flames from the injectors W, so becoming efficiently fire-polished. When the articles V arrive at the exit end − of the glory-hole Q, they are removed from their respective carriers and transferred to an annealing kiln or leer in the ordinary way.

I am aware that annealing-ovens or leers have been arranged to receive plate-glass upon traveling trucks forming a continuous motion through the leer for the annealing thereof, and I am also aware that vertically-moving bars have been used to raise sheets of glass from traveling cars used in the process of annealing. I therefore do not desire to claim any of these arrangements or the mere use *per se* of an endless chain in connection with the movement of glass articles through an annealing-oven, inasmuch as my invention is exclusively applicable to a glory-hole. Therefore What I do claim as my invention, and desire to secure by Letters Patent, is—

An apparatus for fire-polishing glass articles comprising a tunnel, having a rack, and an undulating trackway, suitable means for heating the articles within the tunnel, an endless-chain carrier passing through the tunnel and having holders for the glass articles, said holders having pinions adapted to engage with the rack to produce a rotation of the holders upon their vertical axes, vertically-movable stems within and engaging said holders, their lower ends adapted to ride upon the undulating trackway, whereby the glass articles receive a combined progressive, rotary and reciprocatory movement while receiving fire-polish, substantially as set forth.

In testimony that I claim the foregoing I have hereunto set my hand this 24th day of December, 1895.

HENRY HARLEY PITT.

Witnesses:
ADAM DODD,
THOS. MOTHERSDALE.